United States Patent
Wu

(10) Patent No.: US 9,635,652 B2
(45) Date of Patent: Apr. 25, 2017

(54) OPTIMIZED TRANSMISSION OF MACHINE TYPE COMMUNICATION DATA FROM A MOBILE DEVICE TO A WIRELESS NETWORK

(71) Applicant: ZTE (USA) INC., Richardson, TX (US)

(72) Inventor: Huaming Wu, San Diego, CA (US)

(73) Assignee: ZTE (USA) INC., Richardson, TX (US)

( * ) Notice: Subject to any disclaimer, the term of this patent is extended or adjusted under 35 U.S.C. 154(b) by 116 days.

(21) Appl. No.: 14/383,497

(22) PCT Filed: Mar. 5, 2013

(86) PCT No.: PCT/US2013/029167
§ 371 (c)(1),
(2) Date: Sep. 5, 2014

(87) PCT Pub. No.: WO2013/142040
PCT Pub. Date: Sep. 26, 2013

(65) Prior Publication Data
US 2015/0023281 A1    Jan. 22, 2015

Related U.S. Application Data

(60) Provisional application No. 61/614,360, filed on Mar. 22, 2012, provisional application No. 61/660,588, filed on Jun. 15, 2012.

(51) Int. Cl.
*H04W 72/04* (2009.01)
*H04W 52/14* (2009.01)
(Continued)

(52) U.S. Cl.
CPC ..... *H04W 72/0413* (2013.01); *H04W 52/146* (2013.01); *H04W 52/247* (2013.01);
(Continued)

(58) Field of Classification Search
None
See application file for complete search history.

(56) References Cited

U.S. PATENT DOCUMENTS 8,233,458 B2 * 7/2012 Ahn .............. H04W 52/54
370/335
2010/0041428 A1 * 2/2010 Chen ............. H04W 52/16
455/522

(Continued)

FOREIGN PATENT DOCUMENTS

CN 102215598 A 10/2011
EP 2523518 A1 11/2012
(Continued)

OTHER PUBLICATIONS

ZTE USA Inc., Extended European Search Report, EP13763517.3, Oct. 8, 2015, 9 pgs.

(Continued)

*Primary Examiner* — Hassan Kizou
*Assistant Examiner* — Deepa Belur
(74) *Attorney, Agent, or Firm* — Morgan, Lewis & Bockius LLP

(57) ABSTRACT

A method of transmitting data from a UE to an eNB is provided. In response to a data transmission request from a MTC application, the UE chooses a preamble ID based on the data size and transmits a random access preamble message to the eNB. The eNB returns a random access response message to the UE. The random access response message identifies resource allocated in an uplink channel and includes one or more transmission power control parameters associated with the second uplink channel. After determining that the data size is less than or equal to the allocated resources in the second uplink channel, the UE transmits a scheduled transmission message to the eNB using the allo- (Continued)

cated resource in the second uplink channel at a transmission power level determined by the one or more transmission power control parameters.

15 Claims, 5 Drawing Sheets

(51) Int. Cl.
| | |
|---|---|
| *H04W 52/50* | (2009.01) |
| *H04W 28/06* | (2009.01) |
| *H04W 74/08* | (2009.01) |
| *H04W 28/18* | (2009.01) |
| *H04W 52/24* | (2009.01) |
| *H04W 52/48* | (2009.01) |
| *H04W 4/00* | (2009.01) |

(52) U.S. Cl.
CPC ....... *H04W 52/50* (2013.01); *H04W 72/0473* (2013.01); *H04W 4/005* (2013.01); *H04W 28/06* (2013.01); *H04W 28/18* (2013.01); *H04W 52/242* (2013.01); *H04W 52/48* (2013.01); *H04W 72/0406* (2013.01); *H04W 74/0833* (2013.01)

(56) References Cited

U.S. PATENT DOCUMENTS

| | | | |
|---|---|---|---|
| 2010/0041430 A1 | 2/2010 | Ishii et al. | |
| 2010/0074130 A1 | 3/2010 | Bertrand et al. | |
| 2011/0250918 A1* | 10/2011 | Jen | H04W 52/08 455/509 |
| 2012/0026912 A1 | 2/2012 | Liu | |
| 2012/0147830 A1* | 6/2012 | Lohr | H04W 72/042 370/329 |
| 2012/0254890 A1* | 10/2012 | Li | H04W 4/005 719/313 |
| 2013/0121297 A1* | 5/2013 | Kim | H04L 5/001 370/329 |
| 2014/0079011 A1* | 3/2014 | Wiberg | H04W 74/006 370/329 |
| 2016/0037352 A1* | 2/2016 | Wei | H04W 72/1268 455/454 |

FOREIGN PATENT DOCUMENTS

| | | |
|---|---|---|
| WO | WO2008/042967 A2 | 4/2008 |
| WO | WO2011/150728 A1 | 12/2011 |

OTHER PUBLICATIONS

ZTE USA Inc., Communication Pursuant to Rules 70(2) and 70a(2) EPC, EP13763517.3 Oct. 27, 2015, 1 pg.

ZTE USA Inc., International Preliminary Report on Patentability, PCT/US2013/029167, Sep. 23, 2014, 8 pgs.

Communication Pursuant to Rules 161(2) and 162 EPC, EP13763517.3 , Nov. 18, 2014, 3 pgs.

VIA Telecom, Access Procedure Enhancements for MTC Applications, R2-103968, 3GPP TSG-RAN WG2 Meeting #70bis, Jun. 28-Jul. 2, 2010, 4 pgs.

ZTE, Traffic channel resources congestion evaluation and potential solutions, R2-102825, 3GPP TSG-RAN WG2 #70, May 10-14, 2010, 5 pgs.

ZTE (USA) Inc., International Search Report and Written Opinion, PCT/US2013/029167, Jul. 15, 2013, 10 pgs.

ZTE, Communication Pursuant to Rules 70(2) and 70a(2) EPC, EP13763517.3, Oct. 27, 2015, 1 pg.

\* cited by examiner

OPTIMIZED TRANSMISSION OF MACHINE TYPE COMMUNICATION DATA FROM A MOBILE DEVICE TO A WIRELESS NETWORK

CROSS REFERENCE TO RELATED APPLICATIONS

This Application is a United States National Stage Application filed under 35 U.S.C. §371 of PCT Patent Application Serial No. PCT/US2013/029167 filed on Mar. 5, 2013, which claims the benefit of and priority to U.S. Provisional Patent Application No. 61/614,360 filed on Mar. 22, 2012, and U.S. Provisional Patent Application No. 61/660,588 filed on Jun. 15, 2012, which are hereby incorporated by reference in their entireties.

TECHNICAL FIELD

The presented invention relates to wireless communications and, in particular, to the systems and methods for optimizing the transmission of machine type communication (MTC) data from a mobile device to a wireless network.

BACKGROUND

In a typical mobile communications environment, a user equipment (UE) communicates voice and/or data signals with one or more service networks via base stations (also referred to as "eNBs"). The wireless communications between the UE and the service networks complies with various wireless communication standards, such as the Global System for Mobile communications (GSM) technology, Wideband Code Division Multiple Access (WCDMA) technology, Time Division-Synchronous Code Division Multiple Access (TD-SCDMA) technology, Long Term Evolution (LTE) technology, etc.

Recently, techniques empowering full mechanical automation (e.g., the Internet of Things) are emerging. Some of these techniques require wireless communications between machine-type communications (MTC) devices. Such communications are also known as machine-to-machine (M2M) communications. MTC communication has some unique features different from the human-to-human (H2H) communications. For example, an MTC device like a smart utility meter typically generates a small data transmission during a predefined reporting interval and then goes to sleep for a long time period until the next reporting interval. In another example, a MTC device may only transmit a short but important alarm message. Therefore, the reliability of the MTC communication is important.

SUMMARY

According to some implementations, a method of dynamically transmitting data from a UE to an eNB starts with receiving a data transmission request at the UE, the data transmission request identifying a transmission data size. The UE chooses a preamble ID for the request, the preamble ID at least in part dependent on the transmission data size. The UE then transmits a random access preamble message to the eNB via a first uplink channel, the random access preamble message including the preamble ID. The UE receives a random access response message from the eNB via a downlink channel, the random access response message identifying resource allocated in a second uplink channel that is different from the first uplink channel and including one or more transmission power control parameters for the second uplink channel. After determining that the transmission data size is less than or equal to the allocated resource in the second uplink channel, the UE transmits a scheduled transmission message to the eNB using the allocated resource in the second uplink channel at a transmission power level determined by the one or more transmission power control parameters.

According to some implementations, a mobile communications device for performing an enhanced access procedure comprises a wireless module and a controller module. The wireless module is configured for performing wireless transmissions and receptions to and from a base station of a wireless network. The controller module is configured for performing the following steps: receiving a data transmission request, the request including a data transmission size; choosing a preamble ID for the data transmission request; transmitting a random access preamble to the base station via the wireless module, the random access preamble including the chosen preamble ID; receiving a random access response message from the base station via the wireless module, the random access response message including information about resource allocated in response to the data transmission request, and the resource information including one or more transmission power control parameters; determining a transmission power level based on the one or more transmission power control parameters; transmitting a scheduled message using the determined transmission power level; increasing the transmission power level in accordance with the one or more transmission power control parameters if the transmission of the scheduled message fails; and repeating said transmitting and increasing steps until a successful transmission of the scheduled message or the transmission of the scheduled message has failed for at least a predefined number of times.

BRIEF DESCRIPTION OF THE DRAWINGS

Different aspects of the present invention as well as features and advantages thereof will be more clearly understood hereinafter as a result of a detailed description of implementations of the present invention when taken in conjunction with the accompanying drawings, which are not necessarily drawn to scale. Like reference numerals refer to corresponding parts throughout the several views of the drawings.

DESCRIPTION OF EMBODIMENTS

Reference will now be made in detail to implementations, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details.

In the LTE wireless communication system, a UE may initiate a random access procedure with a base station (eNB) for several reasons, such as (1) initial access from a RRC_IDLE state; (2) initial access after a radio link failure; (3) handover; (4) downlink (DL) data arrival during a RRC_CONNECTED state; and (5) uplink (UL) data arrival during RRC_CONNECTED. The UE performs the random access procedure in a contention-based or a contention-free manner depending on whether a Random Access Channel (RACH) resource used by the UE is pre-assigned by the wireless network or randomly selected by the UE itself.

Figure 1:
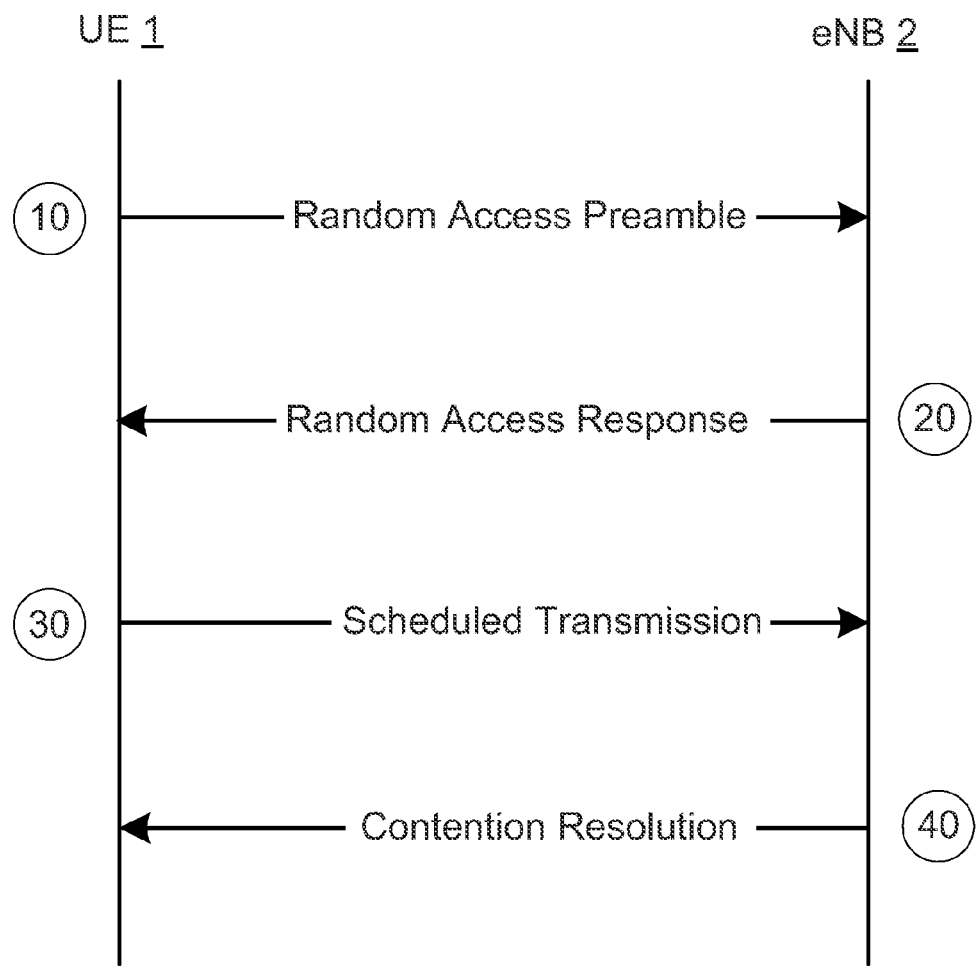
FIG. 1 is a message sequence flow chart illustrating a conventional contention-based random access procedure performed by a UE for requesting a connection to an eNB in the LTE network.

FIG. 1 is a message sequence flow chart illustrating a conventional contention-based random access procedure performed by a UE 1 for accessing an eNB 2 in the LTE network. After receiving a data transmission request, the LTE 1 transmits (10) a random access preamble message to the eNB 2 using a randomly selected resource on the Physical Random Access Channel (PRACH). In some implementations, the random access preamble message includes a 6-bit random access preamble ID, which is selected out of a total of $2^6=64$ possible preamble ID choices. Next, the eNB 2 returns (20) a random access response message to the UE 1 on the Physical Downlink Shared Channel (RDSCH). In some implementations, the random access response message includes: (i) the 6-bit preamble ID, (ii) identification information of the UE 1 in the LTE network (e.g., a cell radio network temporary identifier (C-RNTI)), and (iii) resource configuration information including timing alignment and an initial uplink grant. The initial uplink grant indicates the resource configuration required for subsequent data transmission from the UE 1. After receiving the random access response message from the eNB 2, the UE 1 allocates the resources according to the uplink grant and transmits (30) a scheduled transmission message with the UE identification information to the eNB2 using the allocated resources on the Physical Uplink Shared Channel (PUSCH). In the current LTE specification, the size of the transport blocks depends on the uplink grant conveyed by the random access response step 20. For example, the size is at least 80 bits according to some implementations. Finally, the eNB 2 transmits (40) a contention resolution message containing the specific UE identity information to the UE 1, indicating that the contention is resolved. After receiving the contention resolution message from the eNB 2, the UE 1 completes the random access procedure and starts performing other data, transmission tasks with the LTE network.

Although the random access procedure described above can be used for transmitting MTC data, the current LTE specification does not support the transmission of small-size data over the PRACH channel. Moreover, the scheduling of a large number of MTC devices within a particular area could generate a large amount of MTC control signaling and overload a Mobility Management Entity (MME) in the LTE network, resulting in an unpredictable transmission delay and even disabling the normal service of the network. In addition, the transmission of MTC data may not utilize the resource allocated on the PUSCH that is granted from the eNB after the completion of random access procedure efficiently because the MTC data size is substantially smaller than the PUSCH resource allocated through the random access procedure.

Since the random access procedure already allocates resources for the transmission over PUSCH in connection with the scheduled transmission step 30, one approach of transmitting MTC data is to send the small-size MTC data over the same allocated resource during the random access procedure. By doing so, there is no need to allocate additional PUSCH resource for the MTC data after the random access procedure has completed, thereby reducing additional resource configuration and control signaling transmission overhead and improving the overall system performance. For example, if the size of the MTC data to be transmitted is less than a predetermined transmission data size requirement, the UE includes the MTC data into the scheduled transmission message and then performs the scheduled transmission with the base station after the random access response message from the base station is received. In some implementations, an MTC device practices this approach after the MTC device has already attached to the LTE network and the MTC device receives the small-size MTC data when the device is in an idle state.

In some implementations, instead of the eNB 2 allocating PUSCH resource in the scheduled transmission step 30 as described above, the eNB 2 allocates Physical Uplink Control Channel (PUCCH) resource for transmitting the small-size MTC data if the data to be transmitted is small enough and can be sent over the allocated resource. By doing so, there is no need to allocate further uplink resource for data transmission after the random access procedure has completed. There are additional benefits of using PUCCH rather than PUSCH for transmitting the MTC data. For example, more than one UE can be multiplexed in a single subframe and a maximum of 48 bits can be carried on the PUCCH per subframe depending on the PUCCH format. Moreover, the small payload feature on the PUCCH makes the transmission of the small size MTC data on the PUCCH more reliable than the transmission of the small size MTC data on the PUSCH.

Figure 2:
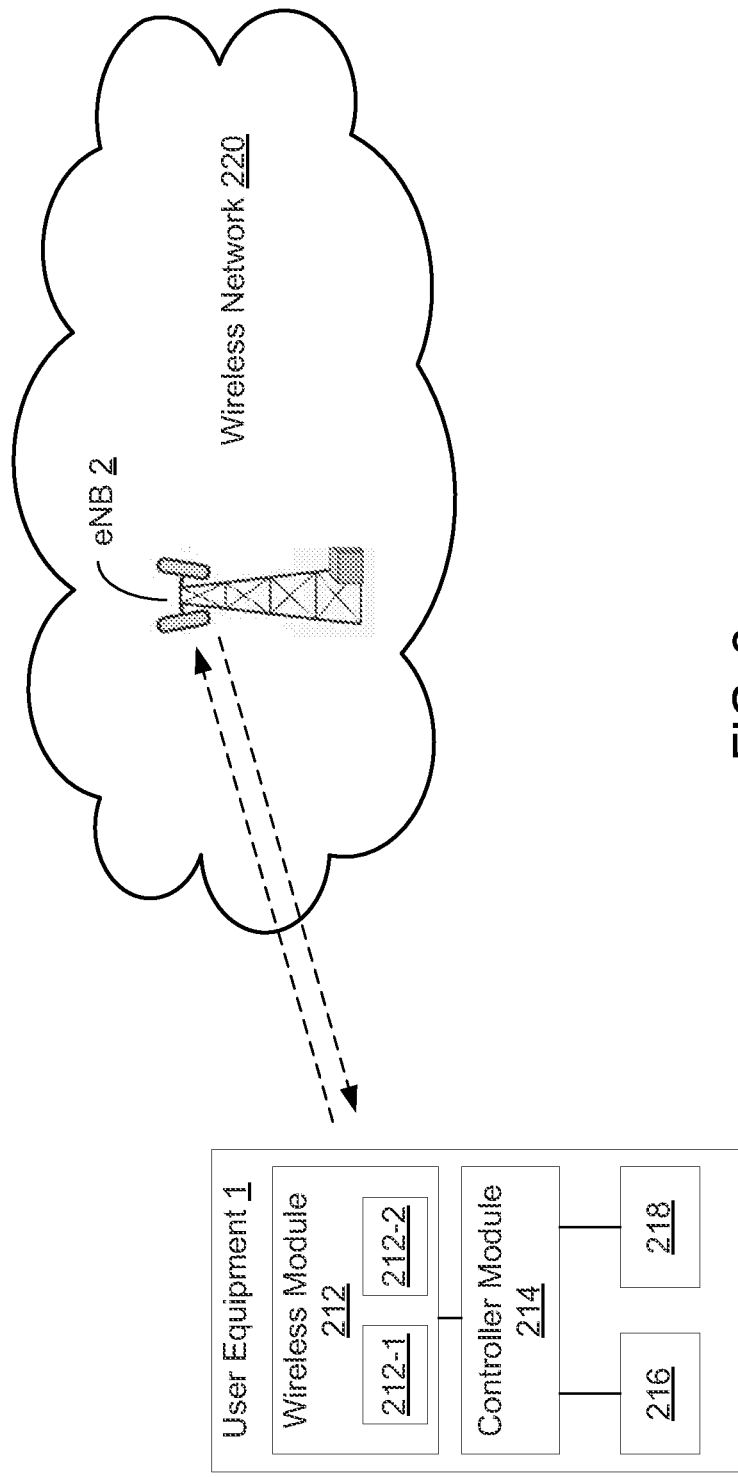
FIG. 2 is a block diagram illustrating a mobile communications LTE system including at least one base station and one user equipment according to an implementation of the invention.

FIG. 2 is a block diagram illustrating a mobile communications LTE system 200 including at least one base station (eNB 2) and one user equipment (UE1) according to an implementation of the invention. In the mobile communications system 200, the UE 1 is wirelessly coupled to the eNB 2 of the wireless network 220 for obtaining wireless services. In this implementation, the UE 1 is an MTC-capable device that can perform machine-to-machine (M2M) communications with other MTC-capable devices in the network system. The UE 1 includes a wireless module 212 for performing the wireless data transmissions and receptions to and from the eNB 2. In some implementations, the wireless module 212 further includes a baseband unit 212-1 and a radio frequency (RF) unit 212-2. The baseband unit 212-1 contains multiple hardware devices to perform baseband signal processing, including analog to digital conversion (ADC)/digital to analog conversion (DAC), gain adjustment, modulation/demodulation, encoding/decoding, etc. The RF unit 212-2 receives RF wireless signals from the eNB 2 and converts the received RF wireless signals into baseband signals to be processed by the baseband unit 212-1. Alternatively, the RE unit 212-2 receives baseband signals from the baseband unit 212-1 and converts the received baseband signals into RF wireless signals to be transmitted to the eNB2. In some implementations, the RE unit 212-2 also includes multiple hardware devices to perform radio frequency conversion. For example, the RF unit 212-2 may include a mixer to multiply the baseband signals with a carrier oscillated at a radio frequency of the mobile communications system. In some implementations, the radio frequency may be (i) 900 MHz, 1900 MHz, or 2100 MHz utilized in WCDMA systems, (ii) 900 MHz, 2100 MHz, or 2.6 GHz utilized in LTE systems, or (iii) other frequencies depending on the radio access technology used by the wireless network 220.

In some implementations, the mobile communication device 210 includes a controller module 214 for controlling the operations of the wireless module 212 as well as other components in the mobile communication device 210. For example, the mobile communication device 210 may also include a display unit and/or a keypad serving as the mart-machine interface 216, a storage unit 218 storing the program codes supporting various applications and communication protocols, etc. The controller module 214 controls the wireless module 212 to perform the random access procedure and related data exchange operations with the wireless network 220 via the eNB 2 as described above in connection with FIG. 1. In some implementations, the wireless network 220 also includes a control node to control the operations of the eNB 2 and other base stations. The wireless network 220 complies with a predefined standard communication protocol. For example, FIG. 2 depicts that the wireless network 220 is an LTE network and the UE 1 complies with the specifications of the LTE communication protocols. But it will be clear to those skilled in the art that different implementations of the present invention are not limited to the LTE network.

Figure 3:
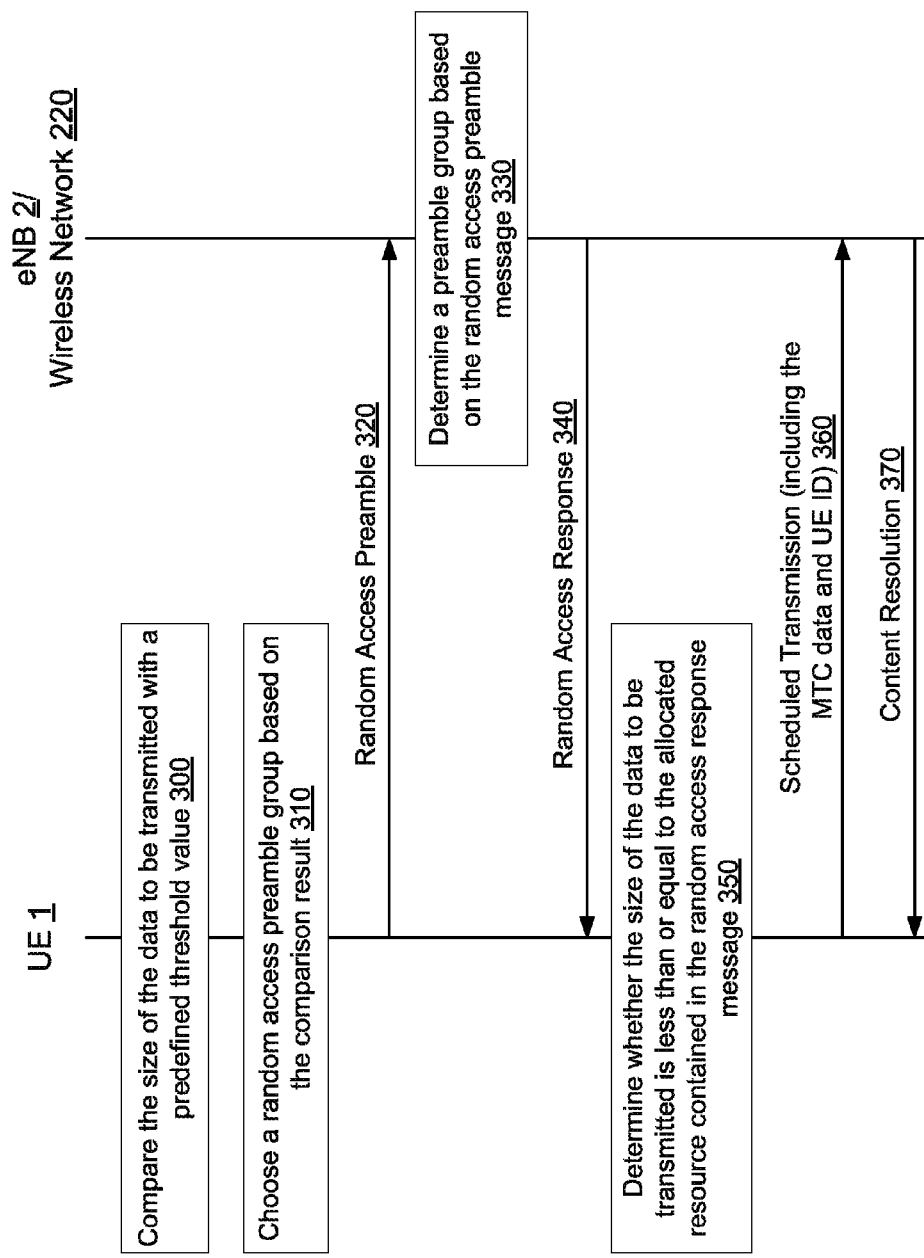
FIG. 3 is a message sequence flow chart illustrating an enhanced random access procedure according to an implementation of the invention.

FIG. 3 is a message sequence flow chart illustrating an enhanced random access procedure in support of MTC data transmission between the UE 1 and the eNB 2 according to an implementation of the invention. The process starts with the UE 1 receiving a request for transmitting MTC data. In response to the data transmission request, the UE 1 compares (300) the size of the MTC data to be transmitted with a predefined threshold value. In some implementations, there is one or more predetermined threshold values. The UE needs to check against at least one of them before performing any random access procedure. In some implementations, these predetermined threshold values are pre-stored in the memory of the UE 1. In some other implementations, the radio resource control (RRC) layer configures and loads these predetermined threshold values into the UE 1. In the latter case, the UE 1 obtains these threshold values through the UE-specific RRC signaling or the system information broadcast.

Next, the UE 1 chooses (310) a random access preamble group based on the comparison result. In some implementations, the LTE random access preamble IDs are divided into at least two groups, each group including one or more preamble Ms (also known as "preamble sequences"). Given a respective predetermined threshold value that may correspond to a particular data size, one of the groups is associated with the threshold value. For example, a first preamble group may include five preamble IDs and the corresponding predetermined threshold value is 10 bits, indicating that the preamble IDs in the first preamble group are used for transmitting data whose size is no more than 10 bits. A second preamble group may include 59 preamble IDs (the total number of preamble IDs is $2^6=64$) and the corresponding predetermined threshold value is 40 bits, indicating that the preamble IDs in the second preamble group are used for transmitting data whose size is longer than 10 bits but no more than 40 bits. Assuming that the first preamble group is chosen, the UE 1 randomly selects one of the five preamble IDs within the first preamble group if the size of the data it plans to transmit is less than or equal to 10 bits. Otherwise, the UE may randomly select a random access preamble ID within the second preamble group. Note that the MTC data size of no more than 40 bits is used here for illustrative purposes and the present application applies to other possible small MTC data size. In some other implementations, the two access preamble groups distinguish MTC devices from other non-MTC UEs such that one access preamble group is for the MTC devices and the other access preamble group for non-MTC devices. In this case, the data request may include an attribute identifying whether the request is from an MTC device or not. In yet some other implementations, the random access preambles are divided into more than two groups to further differentiate the data size to be transmitted during the scheduled transmission step. In this case, more predetermined threshold values are needed. For instance, there could be three access preamble groups, one group reserved for normal non-MTC UEs and the other two groups for differentiating different data sizes to be transmitted from the MTC UE. After selecting a preamble ID from a chosen random access preamble group, the UE 1 transmits (320) a random access preamble message including the selected random access preamble ID to the eNB 2 using a randomly selected RACH resource.

After receiving the random access preamble message, the eNB 2 identifies the preamble ID within the message and determines (330) a particular random access preamble group associated with the message. Based on the specific random access preamble group, the wireless network 220 performs the resource allocation accordingly. For example, the eNB 2 may allocate the PUCCH format 2 resource (which allows a maximum data size of 20 bits) for a particular UE if the random access preamble belongs to the first group. The eNB 2 may allocate the PUCCH format 3 resource (which allows a maximum of 48 bits) for the UE if the random access preamble belongs to the second group. In other words, the maximum size of MTC data is assumed to be 48 bits in this example. In another example, the eNB 2 may allocate the PUCCH resource for the UE if the random access preamble belongs to the first group and allocate the PUSCH resource for the UE if the random access preamble belongs to the second group. If three preamble groups are defined, the eNB 2 may allocate the PUCCH format 2 resource for the UE if the random access preamble belongs to the first group, allocate the PUCCH format 3 resource for the UE if the random access preamble belongs to the second group, and allocate the PUSCH resource for the UE, if the random access preamble belongs to the third group.

After performing resource allocation, the eNB 2 returns (340) a random access response message to the UE 1. In some implementations, the random access response message includes: (i) the same 6-bit random access preamble ID chosen by the UE 1 in the random access preamble step, (ii) a timing alignment determined by the wireless network 220, (iii) an initial uplink grant, and (iv) identification information of the UE 1 (e.g., TC-RNTI) used for subsequent communication between the UE and the wireless network. In some implementations, the initial uplink grant indicates the PUSCH/PUCCH resource allocated for the scheduled transmission in the next step of random access procedure.

After receiving the random access response message from the eNB 2 in the downlink, the UE 1 determines (350) whether the size of the data to be transmitted is less than or equal to the allocated resource contained in the random access response message and how to transmit the data in the scheduled transmission step. In some implementations, although the UE 1 specifies the transmit data size or the type of resource (e.g., PUSCH or PUCCH) it prefers to use in a particular preamble ID in the random access preamble step, there is no guarantee that the eNB 2 can allocate enough resource requested by the UE 1. In this case, the UE 1 needs to determine whether it has enough resource before taking any further action.

Assuming that the size of the data to be transmitted is less than or equal to the size of payload of the allocated resource, the UE 1 generates a scheduled transmission message including at least the data to be transmitted and the identification of the UE 1. Next, the UE 1 transmits (360) the scheduled transmission message to the eNB 2 using the allocated resources on either PUCCH or PUSCH. For example, if the data to be transmitted is small enough (e.g., MTC data of less than 10 bits), such data can be transmitted using a single message during the scheduled transmission step. There is no need to allocate another uplink resource for the data after the random access procedure has completed. If the data is large enough such that it cannot be transmitted using a single message during the scheduled transmission step, the data is segmented and transmitted multiple times on the allocated PUCCH/PUSCH resource after the random access procedure is completed.

After receiving the scheduled transmission message via the eNB 2, the wireless network 220 associates the scheduled transmission message with the UE that sends the random access request according to the specific UE identification information (e.g., TC-RNTI) in the message. The wireless network 220 then transmits (370) a contention resolution message including the specific UE identification information to the UE 1 via the eNB 2. Upon receiving the contention resolution message that contains the specific UE identification information identifying the UE 1 via the wireless module 212, the controller module 214 understands that the enhanced access channel between the UE 1 and the eNB 2 has been successfully established.

In some implementations, the UE 1 applies a predefined threshold value to a data size in order to determine whether to utilize the enhanced access procedure of the present invention. If the data size is less than or equal to the threshold value, the UE 1 then chooses the enhanced access procedure for transmitting the small-size data in the scheduled transmission step and schedules the transmission on PUCCH or PUSCH to the eNB 2. If the data size is greater than the threshold value, the UE 1 then uses a normal random access procedure and transmits the data to the eNB 2 on the PUSCH after the conventional access procedure has been completed.

Figure 4:
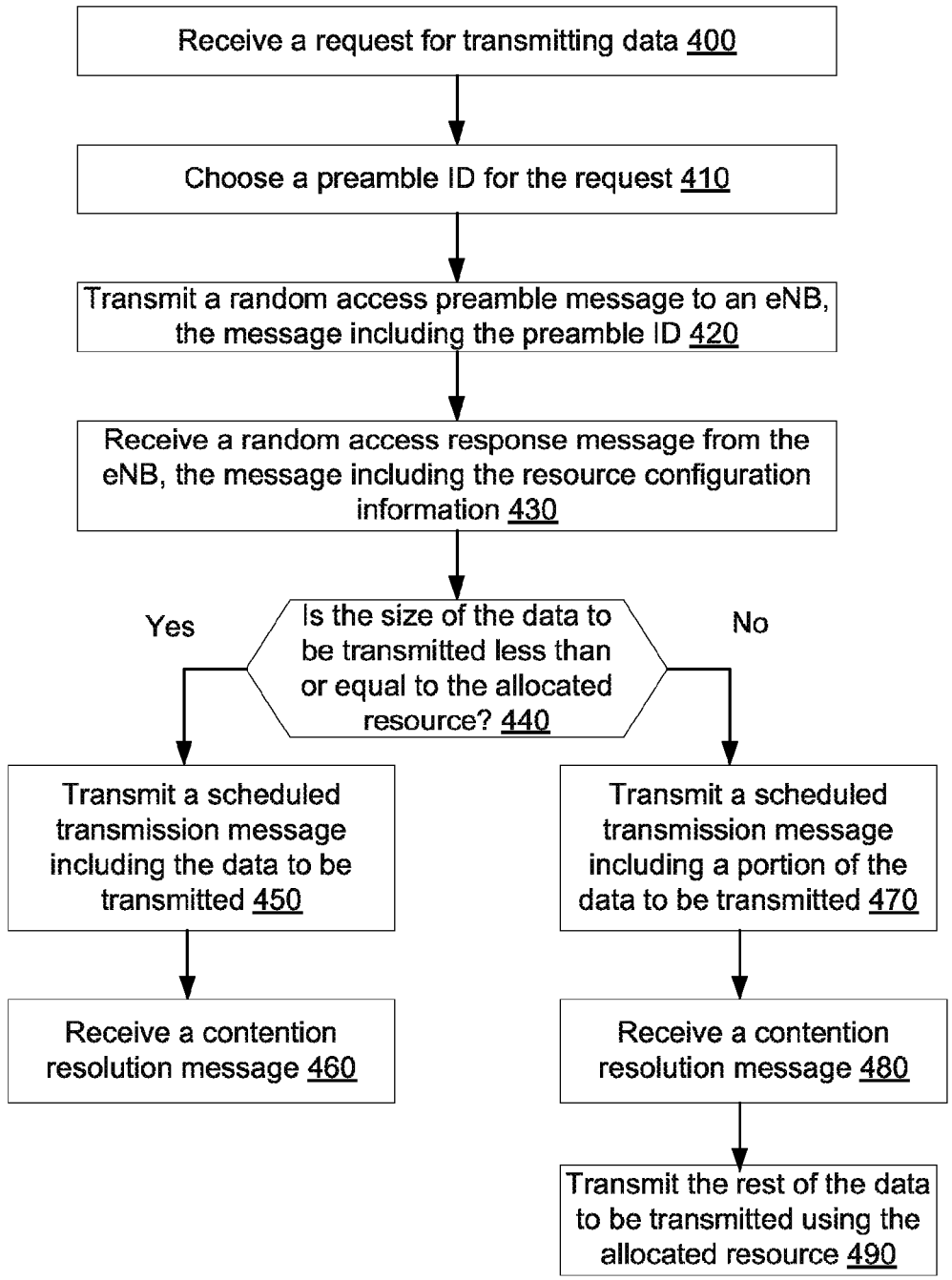
FIG. 4 is a flow chart illustrating a data transmission method for small data according to an implementation of the invention.

FIG. 4 is a flow chart illustrating a data transmission method for small data according to an implementation of the invention. In this implementation, the data transmission method is performed by a UE including a wireless module like the one shown in FIG. 2. As described above, the wireless module 212 is responsible for performing wireless data transmissions and receptions to and from the eNB 2.

First, the UE receives (400) a data transmission request and chooses (410) a random access preamble ID for the request. In some implementations, the random access preamble IDs are divided into multiple preamble groups representing different resource requirements and a particular preamble ID is semi-randomly selected from multiple possible preamble IDs within a specific group. For example, the UE first organizes all the possible preamble IDs into multiple groups and associates with each group a predefined threshold value. The UE identifies a particular group of preamble IDs based on the transmission data size and randomly selects one of the preamble IDs in the identified preamble group for the request. The UE then transmits (420) a random access preamble message including the semi-randomly selected preamble ID to a wireless network via its wireless module to start a random access procedure.

Subsequently, the UE receives (430) a random access response message including the resource configuration information from the eNB via the wireless module. In some implementations, the wireless network allocates resource for the UE based on the random access preamble ID included in the random access preamble message. In response to the random access preamble message, the wireless network returns the random access response message to the UE via the eNB.

Next, the UE determines (440) whether the size of the data to be transmitted is less than or equal to the allocated resources. If so (440—yes), the UE then transmits (450) a scheduled transmission message including the data to the eNB via the wireless module. For example, the UE may transmit the scheduled transmission message via the PUCCH if the data to be transmitted is very small (e.g., less than 40 bits) like the data packets from many MTC devices. Thereafter, the UE receives (460) a contention resolution message that contains the UE's specific identification information via the wireless module and determines that the enhanced access procedure is completed. The wireless network sends a contention resolution message after receiving the scheduled transmission message via the eNB. In some implementations, the contention resolution message also contains the specific UE identification information.

If the data size is greater than the allocated resources (440—no), the UE transmits (470) a scheduled transmission message that includes a portion of the data to be transmitted via the wireless module and then receives (480) a contention resolution message corresponding to the scheduled transmission message via the wireless module from the eNB. The UE then transmits (490) the remainder of the data using the same allocated resources.

The number of random access preamble groups relates to the number of threshold values and different groups may have the same number of preamble IDs or different numbers of preamble IDs. In one case, the 64(=$2^6$) selectable preamble IDs are evenly divided into four preamble groups A, B, C and D, each group having 16 preamble IDs. In another case, the 64 selectable preamble IDs are allocated within the four groups as follows: 8, 16, 8 and 32.

As noted above in connection with FIG. 3, the wireless network 220 allocates resource based on the random access preamble message it receives from the UE 1 and returns the allocated resource to the UE 1 using a random access response message. Note that the format of the random access response message is defined as in 3GPP TS 36.213 (version 10.5.0, Release 10): "Evolved Universal Terrestrial Radio Access (E-UTRA): Physical Layer Procedures." For example, if the resource is scheduled on the PUSCH, the random access response message includes a 20-bit random access response PUSCH grant. The content of the 20 bits starting with the most significant bit (MSB) and ending with the least significant bit (LSB) is defined as follows:

Hopping flag—1 bit
Fixed size resource block assignment—10 bits
Truncated modulation and coding scheme—4 bits
Transmit-Power Control command for scheduled PUSCH—3 bits
Uplink delay—1 bit
Channel State Information (CSI) request—1 bit If the resource is schedule on the PUCCH, the random access response message includes a 20-bit random access response PUCCH grant. The content of the 20 bits starting with the most significant bit (MSB) and ending with the least significant bit (LSB) is defined as follows:
PUCCH resource index—11 bits
PUCCH format indicator—2 bits
Pathloss compensation—3 bits
Transmit-Power Control (TPC) command for scheduled PUCCH—2 bits
Uplink delay—1 bit
Number of sent random access preamble request—1 bit Note that the PUCCH resource index indicates the resource is schedule on the PUCCH. The PUCCH format indicator indicates that which PUCCH format (e.g., format 2 or format 3) is used and hence the associated modulation to be used. The pathloss compensation indicates the difference between the downlink pathloss estimate at the UE 1 and the actual uplink pathloss. The TPC command for the PUCCH indicates the power control for the allocated PUCCH transmission. The uplink (UL) delay field is set to 0 or 1 to indicate whether there is a delay of PUCCH. Finally, the number of sent random access preamble request indicates whether the UE should report the number of sent random access preamble to the eNB. If this field is set to 1, the UE reports the number of sent random access preamble in the next step of scheduled transmission on the allocated PUCCH.

The UE can distinguish between the random access response PUSCH grant and the random access response PUCCH grant. As noted above, the random access preamble ID chosen by the UE during the random access preamble step has an associated transmission data size. In addition, the random access preamble ID can distinguish different types of data (e.g., MTC or non-MTC) and/or different types of UE MTC or non-MTC). For example, two random access preamble groups may be used for different transmit data sizes if all the UEs in a particular wireless network are MTC devices. In another example, the two preamble groups may be used to distinguish MTC devices from normal non-MTC Therefore, when the UE receives the random access response message, it knows in advance whether the initial grant in the random access response message is a PUSCH grant or a PUCCH grant based on the preamble ID appearing in the message and then processes the grant accordingly. The scrambling sequence for the UE's PUSCH or PUCCH is based on C-RNTI contained in the random access response message. More detailed description of the PUSCH and PUCCH scrambling can be found in 3GPP TS 36.211: "Evolved Universal Terrestrial Radio Access (E-UTRA); Physical channels and modulation," 3GPP TS 36.212: "Evolved Universal Terrestrial Radio Access (E-UTRA); Multiplexing and channel coding," and 3GPP TS 36.213: "Evolved Universal Terrestrial Radio Access (E-UTRA); Physical layer procedures."

Among the different parameters in the random access response PUCCH grant, the pathloss compensation and the number of sent random access preamble request are designed to optimize the system performance for the MIC-type UEs as well as other non-MTC UEs. In particular, an UE determines the uplink's transmission power by estimating the downlink path loss (PL) from the downlink reference signal (pilot signal) and using the desired received power for each channel $P_0$ broadcast by the wireless network as follows:

$$P_{PRACH} = \min\{P_{MAX}, P_{0\_PRACH} - PL + (m-1)\Delta_{PRACH} + \Delta_{Preamble}\}$$

where $P_{MAX}$ is a predefined maximum output power of a UE, $P_{PRACH}$ is the transmit power used by the UE for transmitting the random access preamble message (which is not greater than $P_{MAX}$), $\Delta_{PRACH}$ is the power ramping step for PRACH, $\Delta_{Preamble}$ is the preamble-based offset, and m is the preamble transmission attempt number.

$$P_{PUCCH} = \min\{P_{MAX}, P_{0\_PUCCH} + PL + \Delta_{PUCCH\_F} + \delta_{PUCCH}\}$$

where $P_{PUCCH}$ is the transmit power used by the for transmitting on PUCCH, $\Delta_{PUCCH\_F}$ is the power offset for different PUCCH format, and $\delta_{PUCCH}$ is a UE-specific correction value controlled by the TPC command.

In order to optimize the performance of the MTC type applications, the wireless network may have at least one set of power control parameters for each type of MTC UEs. For example, $\Delta_{PRACH\_MTC}$ is the power ramping step designed for MTC UE when using PRACH and $\Delta_{PUCCH\_F\_MTC}$ is the power offset for different PUCCH formats used by MTC UE. In another example, $\Delta_{PRACH\_MTC\_1}$ and $\Delta_{PRACH\_MTC\_2}$ are the power ramping steps for two different types of MTC UEs when using PRACH and $\Delta_{PUCCH\_F\_MTC\_1}$ and $\Delta_{PUCCH\_F\_MTC\_2}$ are the power offsets for two different PUCCH formats used by two different types of MTC UEs. In yet another example, the parameter $P_{0\_PUCCH\_MTC}$ is the desired received power for PRACH for the MTC TIE and $P_{0\_PUCCH\_MTC}$ is the desired received power for PUCCH for MTC UE. The wireless network broadcasts these parameters to the UEs in the network using the system information or RRC signaling so that the UEs can choose the right parameters and adjust its transmit power accordingly when it transmits on the corresponding uplink channel. By doing so, the UEs consume minimal amount of power for transmitting data, which is important for those MTC UEs powered by battery, and achieve a high reliability of delivering important alarm messages that are important for other MTC UEs. It is also beneficial to have multiple sets of power control parameters to balance the PUCCH resource shared by MIC UEs and non-MTC UEs.

Note that the aforementioned MTC-specific power control parameters may be applied to UEs within an entire cell as they are broadcasted within the cell. For more accurate power control, it may be useful to implement a UE-specific power control mechanism. As noted above, the UE downlink path loss estimation PL from the downlink reference signal (pilot signal) is used to determine the uplink transmit power. In some cases, the downlink pathloss estimate is an accurate reflection of the actual pathloss in the uplink transmission. For instance, the serving cells of the downlink transmission and uplink transmission may be different (e.g., the downlink transmission is served by a macro cell and the uplink transmission is served by the pico/femto/relay node). In this case, the pathloss compensation in the random access response PUCCH grant can be used to make the necessary adjustment.

If the number of sent random access preamble request in the random access response PUCCH grant is set to '1', the MTC TIE needs to report the number of random access preambles sent by the UE (including the last successful one). The eNB can use this information to optimize the system performance. For example, in a network with both non-MTC UEs and MTC UEs, the eNB could assign a lower desired received power for PRACH used by MTC UE that is not delay sensitive, $P_{0\_PRACH\_MTC}$, and a smaller power ramping step used by the MTC UE when using the MACH, $\Delta_{PRACH\_MTC}$. By doing so, a balance on the RACH load can be achieved among non-MTC UEs and MTC UEs based on the number of random access preamble sent reported by the MTC UE. In another example, the eNB may increase both the desired received power for PRACH used by a delay-sensitive MTC UE, $P_{0\_PRACH\_MTC}$, and the power ramping step for MTC UE when using PRACH, $\Delta_{PRACH\_MTC}$. Finally, the eNB may use the report of number of random access preamble sent to estimate the MTC UEs' load. Based on this report and other information (e.g., PUSCH load, PUCCH load etc.), the eNB can adjust some parameters and broadcast the UE-specific parameters to UEs for system performance optimization.

Figure 5:
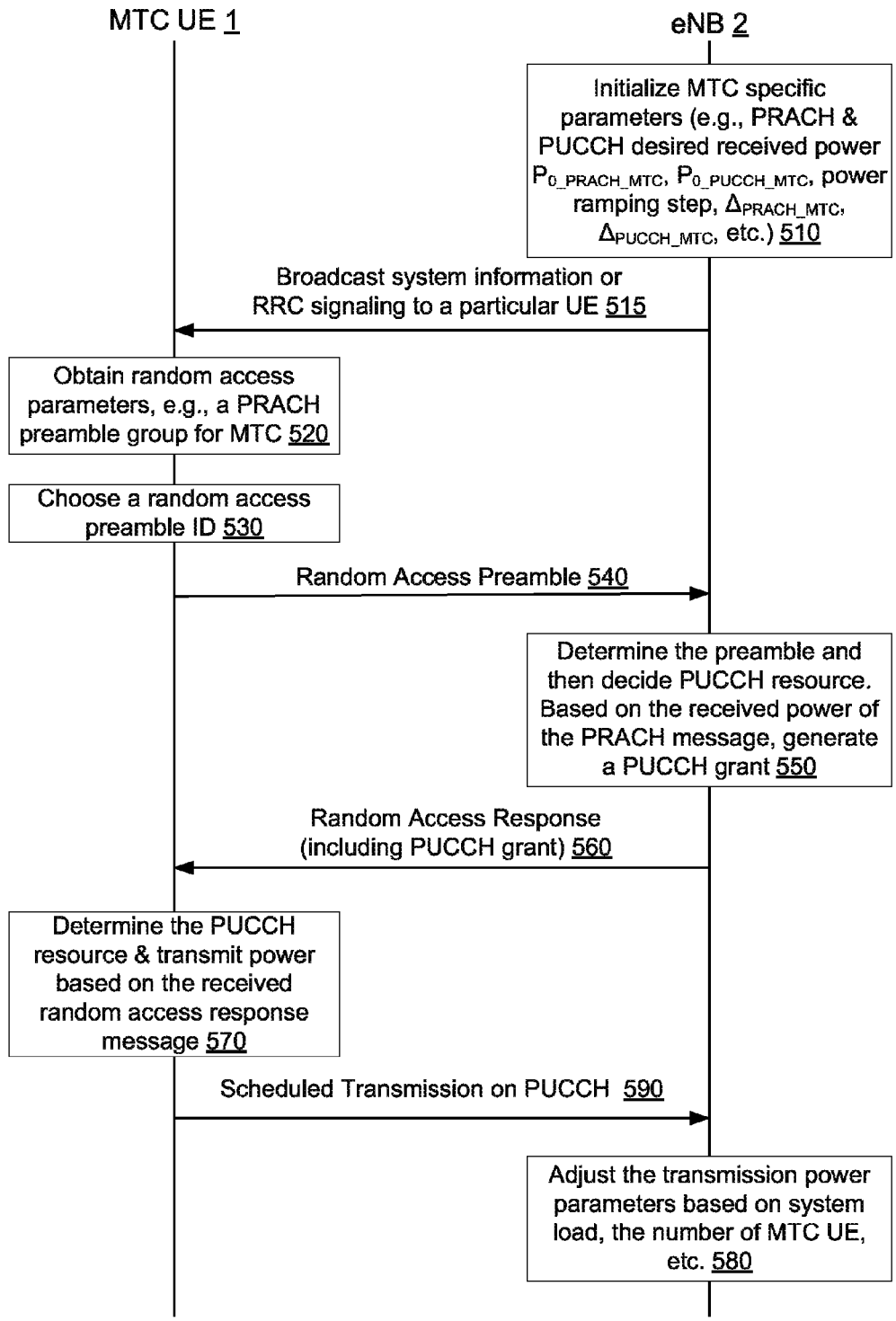
FIG. 5 is a message sequence flow chart illustrating an enhanced random access procedure according to an implementation of the invention.

FIG. 5 is a message sequence flow chart illustrating an enhanced random access procedure according to an implementation of the invention. In order to optimize the uplink transmission on both PRACH and PUCCH, the eNB 2 initializes (510) the MTC-specific transmission power control parameters, e.g., a desired received power on PRACH for MTC UE, $P_{0\_PRACH\_MTC}$, and an associated power ramping step for MTC UE when using PRACH, $\Delta_{PRACH\_MTC}$, and a desired received power on PUCCH for MTC UE, $P_{0\_PUCCH\_MTC}$, and an associated power ramping step for MTC UE when using PUCCH, $\Delta_{PUCCH\_MTC}$, etc. The eNB 2 provides (515) ate parameters to a particular UE (e.g., the MTC UE 1) through RRC signalling or via broadcasting the system information block (SIB) to the entire cell.

Independently or thereafter, the MTC UE 1 obtains (520) the random access parameters (e.g., a PRACH preamble group for the MTC) using the method as described above in connection with FIGS. 1, 3 and 4. Using the MTC-specific system parameters from the eNB 2, the MTC UE 1 chooses (530) a random access preamble ID and transmits (540) a message including the random access preamble ID to the eNB 2.

Upon receipt of the random access preamble message, the eNB 2 identities the preamble ID in the message and then determines (550) which uplink channel should be used for data transmission and allocates the resources for the MTC UE 1 accordingly. If it is the PUSCH, the eNB 2 then decides the PUSCH resources to be allocated for the MTC UE 1 and determines the parameters for the PUSCH grant as describe above. If it is the PUCCH, the eNB 2 then decides the PUCCH resources to be allocated for the MTC UE 1. In particular, the eNB 2 generates a PUSCH/PUCCH grant as described above based on the received power of the PRACH message that carries the random access preamble.

Assuming that PUCCH is chosen to be the uplink channel, the eNB 2 returns (560) a random access response message to the UE 1, the messaging including the generated PUCCH grant. The UE 1 then determines (570) the PUCCH resources allocated by the wireless network for the UE 1 based on the received random access response message. In particular, the UE determines a transmission power level based on the transmission power control parameters in the PUCCH grant and transmits (590) the scheduled transmission message using the allocated PUCCH resources at the determined transmission power level. If the transmission is successful, the MTC UE 1 moves to the next step of exchanging information with the eNB 2. If not, the MTC UE 1 may update (e.g., increase) its transmission power level based on the parameters in the PUCCH grant until either a successful transmission of the scheduled message or the transmission of the scheduled message has failed for at least a predefined number of times. In some implementations, the eNB 2 dynamically adjusts (580) the MTC-specific transmission power parameters based on the current system load, the number of MTC UEs, and the received number of sent random access preamble, etc., and re-broadcasts the updated parameters to the MTC UE 1 and/or other MTC UEs.

In some implementations, the above-described methods and their variations may be implemented as computer software instructions or firmware instructions. Such instructions may be stored in an article with one or more machine-readable storage devices connected to one or more computers or integrated circuits or digital processors such as digital signal processors, microprocessors, or micro-control units (MCU), and the instructions may perform the transmission method for transmitting MTC data. In addition, the method may be applied to any MTC capable mobile communications device supporting the WCDMA technology and/or the LTE technology. Other variations and enhancements are possible based on what is mentioned here.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

I claim:

1. A method of transmitting data from a UE to an eNB, comprising:
    at the UE:
    generating a data transmission request, wherein the data transmission request identifies a transmission data size and data to be transmitted;
    choosing a preamble ID for the request, wherein the preamble ID is at least in part dependent on the data size;
    transmitting a random access preamble message to the eNB via a Physical Random Access Channel, wherein the random access preamble message includes the preamble ID;
    receiving a random access response message from the eNB via a Physical Downlink Shared Channel, wherein the random access response message identifies resource allocated in a Physical Uplink Control Channel and the random access response message includes one or more transmission power control parameters associated with the Physical Uplink Control Channel; and
    in accordance with a determination that the data size is less than or equal to the allocated resources in the Physical Uplink Control Channel, transmitting a scheduled transmission message including the data to be transmitted to the eNB using the allocated resource in the Physical Uplink Control Channel at a transmission power level determined by the one or more transmission power control parameters.

2. The method of claim 1, wherein the eNB is configured to allocate a first format of resource in the Physical Uplink Control Channel when the preamble ID is within a first group of preamble IDs and allocate a second format of resource in the Physical Uplink Control Channel when the preamble ID is within a second group of preamble IDs.

3. The method of claim 1, wherein the random access preamble message includes a random access preamble ID that corresponds to the transmission data size.

4. The method of claim 1, wherein the data to be transmitted is Machine-Type Communications data.

5. The method of claim 1, wherein the size of the data to be transmitted is less than a predefined value.

6. The method of claim 1, wherein the random access response message identifies a resource and a corresponding format associated with the Physical Uplink Control Channel.

7. The method of claim 1, wherein the one or more transmission power control parameters includes a pathloss compensation that indicates a difference between a downlink pathloss estimate at the UE and an actual uplink pathloss through the Physical Uplink Control Channel.

8. The method of claim 1, wherein the random access response message includes an instruction that instructs the UE whether to report a number of sent random access preamble requests.

9. A mobile communications device for performing an enhanced random access procedure, comprising:
    a wireless module for performing wireless transmissions and receptions to and from a base station of a wireless network; and
    a controller module for:
        receiving a data transmission request from a MTC application, the request including a data transmission size and data to be transmitted;
        choosing a preamble ID for the data transmission request;
        transmitting a random access preamble to the base station using a Physical Random Access Channel via the wireless module, wherein the random access preamble includes the chosen preamble ID;
        receiving a random access response message from the base station via the wireless module, wherein the random access response message includes information about resource allocated for the data transmission request in a Physical Uplink Control Channel, and one or more transmission power control parameters;
        determining a transmission power level based on the one or more transmission power control parameters;
        transmitting a scheduled message including the data to be transmitted using the allocated resource in the Physical Uplink Control Channel at the determined transmission power level;
        increasing the transmission power level in accordance with the one or more transmission power control parameters if the transmission of the scheduled message fails; and
        repeating said transmitting and increasing steps until a successful transmission of the scheduled message or the transmission of the scheduled message has failed for at least a predefined number of times.

10. A method performed by an eNB for receiving MTC data from a UE, the method comprising:
    at the eNB:
    initializing MTC-specific transmission power control parameters and including the transmission power control parameters to in a system information block;
    broadcasting the system information block to the UE within a cell associated with the eNB;
    receiving a random access preamble message from the UE via a Physical Random Access Channel, wherein the random access preamble message includes a preamble ID chosen by the UE based on a size of the MTC data;

determining a Physical Uplink Control Channel in accordance with the preamble ID and allocating resource in the Physical Uplink Control Channel for the UE;

sending a random access response message to the UE via a Physical Downlink Shared Channel, wherein the random access response message identifies resource allocated in the Physical Uplink Control Channel; and receiving a scheduled transmission message from the UE using the allocated resource in the Physical Uplink Control Channel at a transmission power level determined by the transmission power control parameters, the scheduled transmission message including at least a portion of the MTC data.

11. The method of claim 10, wherein the eNB is configured to allocate a first format of resource in the Physical Uplink Control Channel when the preamble ID is within a first group of preamble IDs and allocate a second format of resource in the Physical Uplink Control Channel when the preamble ID is within a second group of preamble IDs.

12. The method of claim 10, wherein the size of the MTC data is less than a predefined value.

13. The method of claim 10, wherein the random access response message identifies a resource and a corresponding format associated with the Physical Uplink Control Channel.

14. The method of claim 10, wherein the transmission power control parameters includes a pathloss compensation that indicates a difference between a downlink pathloss estimate at the UE and an actual uplink pathloss through the Physical Uplink Control Channel.

15. The method of claim 10, wherein the random access response message includes an instruction that instructs the UE whether to report a number of sent random access preamble requests.

* * * * *